United States Patent [19]

Cammack

[11] Patent Number: 4,526,348
[45] Date of Patent: Jul. 2, 1985

[54] FENCE CONNECTOR

[76] Inventor: Malcolm E. Cammack, 9052 140th St. North, Hugo, Minn. 55038

[21] Appl. No.: 316,113

[22] Filed: Oct. 29, 1981

[51] Int. Cl.³ .................................................. E04H 17/14
[52] U.S. Cl. ...................................... 256/65; 403/233;
403/191; 29/423; 29/526 R
[58] Field of Search ............... 403/233, 191, 235, 234;
29/423, 526 R; 256/65, 68, 69

[56] References Cited

U.S. PATENT DOCUMENTS

| 970,737 | 9/1910 | Neller | 403/235 |
|---|---|---|---|
| 1,192,216 | 7/1916 | Louden | 403/235 |
| 1,541,326 | 6/1925 | Clough | 403/233 X |
| 2,003,531 | 6/1935 | Galante | 403/191 X |
| 2,764,438 | 9/1956 | Haviland | 403/234 |
| 2,775,473 | 12/1956 | Brewer | 256/68 X |
| 4,039,166 | 8/1977 | Elgin | 256/65 |

FOREIGN PATENT DOCUMENTS

| 162373 | 4/1921 | United Kingdom | 403/191 |
|---|---|---|---|
| 290106 | 5/1928 | United Kingdom | 403/191 |

Primary Examiner—Andrew V. Kundrat
Attorney, Agent, or Firm—Terryl K. Qualey

[57] ABSTRACT

A fence connector and a method for connecting round wooden posts to round wooden rails to make a fence. The connector is a unitary sheet metal connector having a central bridge portion and a pair of connection flanges, one at each end of the bridge portion. The central bridge portion is apertured for fastening to the post or rail and the connection flanges are apertured for fastening to the other fence part (i.e. the rail or post). The connector may be preformed with its connection flanges formed into an arc about an axis parallel to the length of the connector to generally conform to the periphery of a rail or post or, in accordance with the method of the invention, the flanges may be bent around the rail or post to form the arc as the fence is being assembled.

9 Claims, 14 Drawing Figures

FENCE CONNECTOR

FIELD OF THE INVENTION

The present invention relates to a fence connector for connecting round wooden posts to round wooden rails.

Background of the Invention

The prior art includes many fencing systems for the construction of wooden fences utilizing rectangular posts and rails as disclosed in U.S. Pat. Nos. 324,656; 361,880; and 4,114,861. It also includes many fencing systems utilizing round metal posts as, for example, in U.S. Pat. Nos. 287,923 and 3,604,687.

There have, however, been few fences constructed in recent times utilizing round wooden posts and round wooden rails, probably because of the absence of a reliable connector. Yet such fences obviously would be as functional as the others for use, for example, in constructing riding rings and feed lots and they would also be attractive so that they could be used in landscaping and other decorative fencing.

SUMMARY OF THE INVENTION

The present invention provides a fence connector and a method for connecting round wooden posts to round wooden rails.

The connector is a unitary sheet metal connector having a central bridge portion and a pair of connection flanges, one at each end of the bridge portion. The central bridge portion is apertured for fastening to a round wooden post or rail. Each of the connection flanges is formed into an arc about an axis parallel to the length of the connector to generally conform to the periphery of the fence part (i.e. the rail or post) opposite to that which the bridge portion is to be fastened (i.e. the post or rail) and each of the connection flanges is apertured for fastening to the rail or post.

The method comprises providing the connector in a flat sheet form, fastening it to the posts and rails and bending the connection flanges into an arc around the rail or post to conform to the periphery of the rail or post.

THE DRAWING

DESCRIPTION OF THE PREFERRED EMBODIMENTS

Each of the embodiments of the connector of the present invention is constructed for connecting round wooden rails 20 to round wooden posts 21 to make a fence. Each of the embodiments of the method comprises providing a flat sheet metal piece appropriately cut to form a connector in accordance with the invention and applying the flat connector piece to make a rail to post connection and at the same time bending it to form the connector of the present invention.

Figure 1:
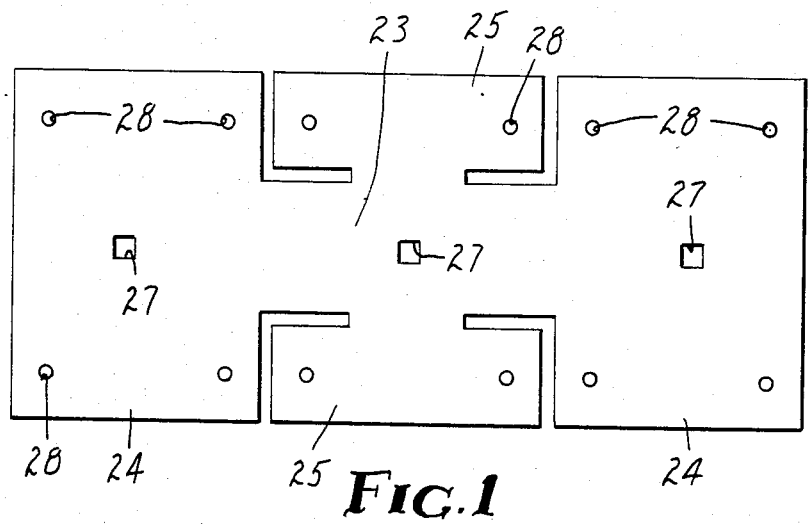
FIG. 1 is a plan view of a planar piece of sheet metal cut for use in forming the connector of the present invention and for use in the method of the present invention to form a run connection between round wooden posts and round wooden rails.

FIG. 1 illustrates a flat sheet metal connector piece appropriately cut to make a run connector in accordance with the present invention. In the presently preferred embodiment, it has a width of six inches and a length of fourteen inches. It has a central bridge portion 23, a pair of rail connection flanges 24, one at each end of the bridge portion 23 and a pair of post connection flanges 25. The post connection flanges lie one on each side of the central bridge portion 23 and are connected to the bridge portion by a short neck portion midway of the length of the bridge portion. The bridge portion 23 and the rail connection flanges 24 are each centrally formed with a square aperture 27 for a carriage bolt and the corners of the rail connection flanges 24 and the ends of the post connection flanges 25 are formed with round nail apertures 28.

Figures 2, 3:
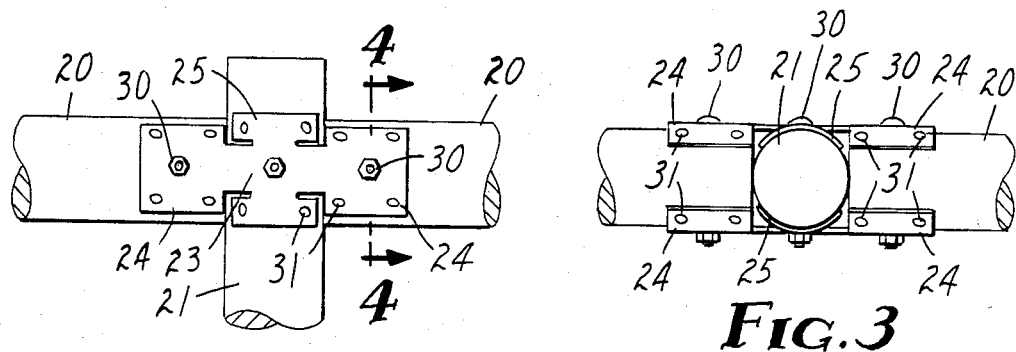
FIG. 2 is an elevation view of a fence connection utilizing the sheet metal piece of FIG. 1 which has been formed to complete the connector of the present invention following the method of the present invention.
FIG. 3 is a top view of the connection of FIG. 2.
Figure 4:
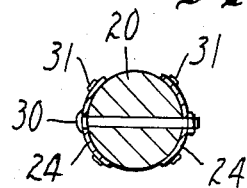
FIG. 4 is a cross sectional view taken along line 4—4 of FIG. 2.

FIGS. 2 through 4 illustrate the use of two of the flat connector pieces of FIG. 1 formed into the completed form of the run connector of the present invention. A carriage bolt hole is first drilled through a post 21 centrally of the post and at the height at which it is desired to connect the rails 20. Carriage bolt holes are similarly drilled in the ends of the rails 20 to align with the carriage bolt apertures 27 in the rail connection flanges 24. A flat sheet metal connector piece is then placed on each side of the post 21 with the carriage bolt aperture 27 in the bridge portion 23 aligned with the carriage bolt hole in the post and a carriage bolt 30 is placed through the sheet metal pieces and the post and secured. The post connection flanges 25 may then be bent in an arc around the post 21 (and thus about an axis parallel to the center line across both of the post connection flanges 25) to conform to the periphery of the post 21. Nails 31 are then nailed through apertures 28 in the post connection flanges 25 to complete the connection to the post. The rails are then lifted into place and connected through the aligned carriage bolt holes 27 in the rail connection flanges 24 and through the rail 20 by a carriage bolt 30. Finally, the rail connection flanges 24 are bent into an arc around the rails 20 (and thus about an axis parallel to the length of the connector) to conform to the periphery of the rail 20 and nails 31 are nailed through the apertures 28 in the post connection flanges 25 to complete the run connection.

Thus, in accordance with the method of the present invention the connector of the present invention is formed as the fence is constructed. However, the connector may also be partially or completely preformed with arcuate rail connection flanges 24 and arcuate post connection flanges 25 if it is found desirable to minimize or eliminate the metal bending by the person constructing the fence. It is presently preferred to construct the run connector of fourteen gauge commercial quality cold rolled steel to provide a very solid and reliable run connection. With this material it is not very difficult to bend the flanges 24 and 25 as the connector is applied. It is presently believed that it will be most desirable to apply the connector in accordance with the method of the present invention because of the variation in diameter of presently available round wooden rails 20 and posts 21.

Figure 5:
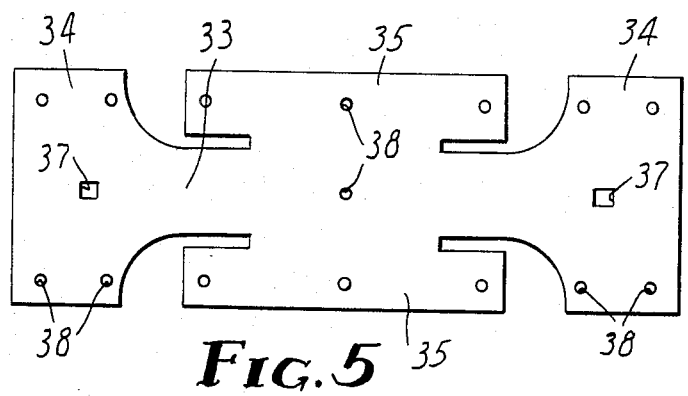
FIG. 5 is a plan view of a planar piece of sheet metal cut for use in forming a connector in accordance with the present invention and for use in the method of the present invention to make a corner connection, a terminal connection or one form of run connection.

FIG. 5 illustrates a flat sheet metal connector piece for forming a corner connector in accordance with the present invention. In the presently preferred embodiment, it is proportioned as illustrated with a width of six inches and an overall length of eighteen inches. The corner connection piece has a central bridge portion 33, a pair of rail connection flanges 34, one at each end of the bridge portion 33, and a pair of post connection flanges 35. The post connection flanges 35 lie one on each side of the central bridge portion 33 and are connected to the bridge portion by a short neck portion midway of the length of the bridge portion. The square carriage bolt apertures 37 are formed centrally through the rail connection flanges 34 and round nail holes 38 are formed through the corners of the rail connection flanges 34, the ends and center of the post connection flanges 35 and the center of the bridge portion 33.

Figure 6:
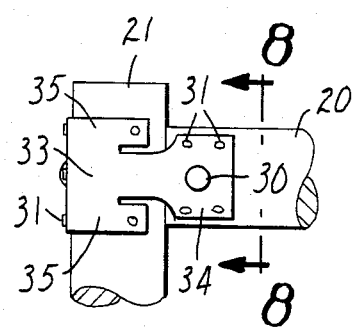
FIG. 6 is an elevation view of a corner connection utilizing the connector of FIG. 5 formed and applied according to the present invention.
Figure 7:
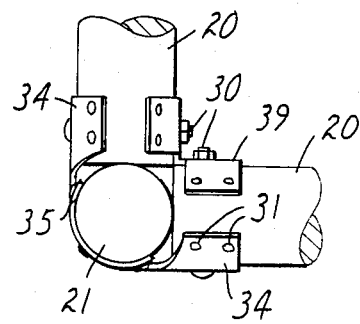
FIG. 7 is a top view of the connection of FIG. 6.
Figure 8:
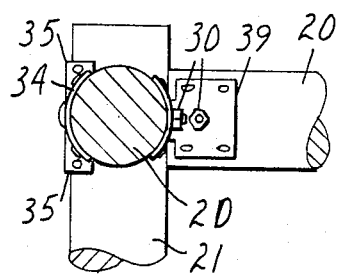
FIG. 8 is a cross sectional view taken along line 8—8 of FIG. 6.

FIGS. 6 through 8 illustrate the corner connector piece of FIG. 5 applied to form a corner connector in accordance with the present invention. The sheet metal piece of FIG. 5 is first nailed to the corner post 21 on the outside of the post and at the desired height through the line of three nail holes 38 across the bridge portion 33 and the post connection flanges 35. The central bridge portion 33 and the post connection flanges 35 are then bent into an arc around the post 21. The central bridge portion 33 is bent midway of its length through 90° around the post and the post connection flanges 35 are continued to be bent into an arc around the post (and thus about an axis parallel to the center line across both of the post connection flanges 35) to conform to the periphery of the post 21. The post connection flanges 25 are then nailed to the post through the nail apertures 38 at their ends. Carriage bolt apertures are drilled transversely through the rails 20 to align with the carriage bolt apertures 37 through the rail connection flanges 34. The rails 20 are lifted into place and carriage bolts 30 are inserted through the carriage bolt holes 37 in the rail connection flanges 34 and the aligned carriage bolt holes through the rails 20. In the illustrated connection a flat metal sheet 39, having a narrow neck midway of its length at which it is bent 90°, and formed with a longitudinal carriage bolt slot at each end, is placed on the inside of the corner. The carriage bolts 30 pass through the inside corner sheet 39, and the sheet has apertured flanges that are bent in an arc around and nailed to the rails to add rigidity to the corner and to provide backing for the carriage bolt nuts. Finally, the rail connection flanges 34 are bent into an arc around the rails 20 (and thus about an axis parallel to the length of the connector) to conform to the periphery of the rails 20 and are nailed to the rails through the nail apertures 38 along their edges to complete the corner connection.

The corner connector sheet metal piece is preferably formed of eighteen gauge commercial quality cold rolled steel. As with the run connector, the corner connector may, if desired, be preformed during manufacture but it is presently preferred that the sheet metal connector piece be supplied in flat form and the bends be made by the workmen as the fence is constructed.

Figure 9:
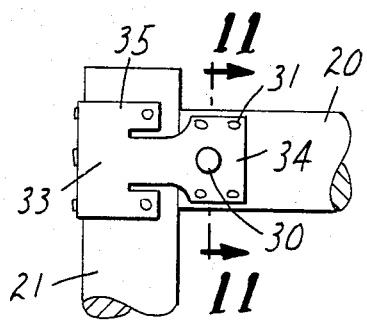
FIG. 9 is an elevation view of a terminal connection, utilizing substantially the same flat sheet metal connector piece as that illustrated in FIG. 5, formed and applied in accordance with the present invention.
Figure 10:
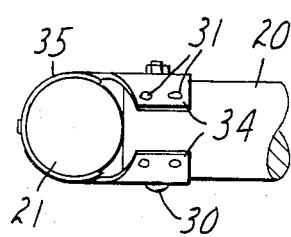
FIG. 10 is a top view of the connection of FIG. 9.
Figure 11:
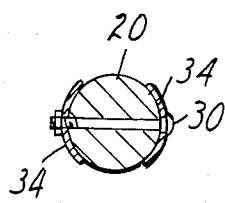
FIG. 11 is a cross section view taken along line 11—11 of FIG. 9.

FIGS. 9 through 11 illustrate a terminal connector constructed in accordance with the present invention. The terminal connector utilizes a sheet metal piece of the same general configuration of that for the corner connector illustrated in FIG. 5 and differs only in the length of the bridge portion 33. In the terminal connector of FIGS. 9 through 11 the bridge portion 33 must be longer so that it can pass 180° around the post 21. In the presently preferred embodiment, the overall length of the terminal connector is twenty-one inches. The terminal connector is applied similarly to the corner connector. The differences are that the bridge portion 33 is bent through 180° to bring the rail connection flanges 34 into parallel and a single carriage bolt 30 passes through both rail connection flanges 34 to connect a single rail 20 to the post 21.

Figures 12, 13, 14:
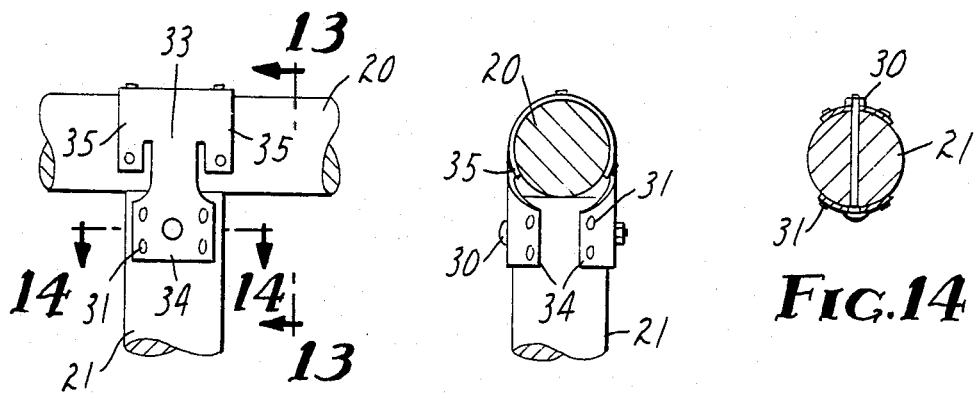
FIG. 12 is an elevation view of a run connection, utilizing the same flat sheet metal connector piece utilized in the terminal connection of FIGS. 9-11, formed and applied in accordance with the present invention.
FIG. 13 is a cross sectional view taken along line 13—13 of FIG. 12.
FIG. 14 is a cross sectional view taken along line 14—14 of FIG. 12.

FIGS. 12 through 14 illustrate the use of the same connector illustrated in FIGS. 9 through 11 to make a run connection. In this case a pair of rails 20 are butted on a post 21, the flat sheet metal connector piece is nailed to the rails 20 through the central nail holes in the flanges 35, and the bridge and the flanges 35 are bent around the rails 20 to bring the end flanges 34 into contact with the post 21. The flanges 35 are then nailed to the rails through nail holes 38, the connector is bolted to the post through carriage bolt apertures 37 aligned with a similar hole through the post 21 and the end flanges 34 are bent around the posts 21 and nailed through apertures 38 to complete the connection. The embodiment of FIGS. 12 through 14 may be particularly desirable in constructing a low level straight run of divider or decorative fencing.

The connectors illustrated in the drawings and described above are designed for use where strength is important, for example in the construction of a riding ring or a feed lot. For landscaping and other decorative fencing it will often be adequate to use a lighter gauge metal and lag screws or nails may be substituted for the carriage bolts. It will also often be adequate for even the heavier duty applications to use the lag screws or nails instead of the carriage bolts, and this will be particularly desirable for fence construction sites where it is inconvenient to drill holes through the posts and rails.

I claim:

1. A fence connector for connecting round wooden posts to round wooden rails, comprising:
   a unitary sheet metal connector having a central bridge portion, a pair of connection flanges, one at each end of said bridge portion, and a second pair of connection flanges, one on each side of said central bridge portion and connected to said bridge portion by a short neck portion midway of the length of said bridge portion, said central bridge portion being narrower than said connection flanges at its ends to bridge between a post and a rail, and being apertured for fastening to a said round wooden post or rail, and each of said connection flanges at the ends of said central bridge portion being formed into an arc about an axis parallel to the length of said connector and each of said second pair of connection flanges being formed into an arc about an axis perpendicular to the length of said connector to generally conform to the periphery of a said round wooden rail or post, and each of said connection flanges being apertured for fastening to a said round wooden rail or post.

2. The fence connector of claim 1 wherein said connection flanges at the ends of said central bridge portion are formed to conform and be fastened to a said round wooden rail and said central bridge portion is arcuately bent through 180° midway of its length about a radius generally the same as a said wooden post to pass around a terminal post so that said end connection flanges can be fastened to a single rail.

3. The fence connector of claim 1 wherein said connection flanges at the ends of said central bridge portion are formed to conform and be fastened to a said round wooden post and said central bridge portion is arcuately bent through 180° midway of its length about a radius generally the same as a said wooden rail to pass around a pair of rails butted together on top of a post, and said second pair of connection flanges are apertured for fastening to a said pair of rails on top of a post when said end connection flanges are fastened to the post.

4. A fence connector for connecting a pair of round wooden rails to a round wooden corner post, comprising:

a unitary sheet metal connector having a central bridge portion and a pair of connection flanges, one at each end of said bridge portion, each of said connection flanges being formed into an arc about an axis parallel to the length of said connector to generally conform to the periphery of a said round wooden rail, and each of said connection flanges being apertured for fastening to a said round wooden rail, said central bridge portion being narrower than said connection flanges at its ends to bridge between a post and a rail, being apertured for fastening to a said corner post and being arcuately bent through 90° midway of its length about a radius generally the same as a said corner post to pass around a said corner post so that said connection flanges can be fastened to a pair of said rails meeting at 90° to form a fence corner.

5. A method of making a fence utilizing round wooden posts and round wooden rails, comprising:

providing a unitary sheet metal connector having a central bridge portion and a pair of connection flanges, one at each end of the bridge portion, the central bridge portion being narrower than the connection flanges at its ends to bridge between a post and a rail, and being apertured for fastening to a round wooden post or rail, and each of the connection flanges being apertured for fastening to a round wooden rail or post, fastening the central bridge portion to a post or rail, fastening each of said connection flanges to a rail or post, and bending each of said connection flanges arcuately about its rail or post to conform to the periphery of the rail or post.

6. The method of claim 5 wherein to make a run connection with a rail abutting each side of a post, two of the sheet metal connectors are similarly installed, one on each side of the rails, and in respect to each of the sheet metal connectors said step of providing a unitary sheet metal connector further includes providing the connector with a pair of post connection flanges, one on each side of said central bridge portion and connected to the bridge portion by a short neck portion midway of the length of the bridge portion, each of the post connection flanges being apertured for fastening to a round wooden post, said step of fastening the central bridge portion consists of fastening it to a post, said steps of fastening and bending said connection flanges consist of fastening and bending each of them to conform to a rail, one on each side of the post, and including the steps of fastening the post connection flanges to a post and bending each of the flanges arcuately about the post to conform to the periphery of the post.

7. The method of claim 5 wherein to make a corner connection said step of fastening the central bridge portion consists of fastening it to a post, and there is included the additional step of arcuately bending the central bridge portion midway of its length through 90° around the post, and said steps of fastening and bending said connection flanges consist of fastening and bending each of them to conform to a rail, one to each rail meeting at the post at 90° to form a fence corner.

8. The method of claim 5 wherein to make a terminal connection said step of fastening the central bridge portion consists of fastening it to a post, there is included the additional step of arcuately bending the central bridge portion midway of its length through 180° around the post, and said steps of fastening and bending said connection flanges consist of fastening and bending them to conform to opposite sides of the same rail.

9. The method of claim 5 wherein to make a run connection said step of fastening the central bridge portion consists of fastening it to two rails abutting each other atop a post, there is included the additional step of arcuately bending the central bridge portion midway of its length through 180° around the rails, and said steps of fastening and bending said connection flanges consist of fastening and bending them to conform to opposite sides of the post.

* * * * *